Patented Dec. 17, 1940

2,225,267

UNITED STATES PATENT OFFICE 2,225,267

FUR OR SKIN AND PROCESS FOR ITS PRODUCTION

Siegfried Gottfried, Budapest, Hungary

No Drawing. Application August 1, 1936, Serial No. 93,918. In Hungary August 10, 1935

3 Claims. (Cl. 149—28)

My invention relates to improved furs or skins and to a process by means of which furs or skins, especially lamb's skins of improved quality can be produced.

It is one object of the invention to produce furs or skins, especially lamb's skins which under certain conditions prevailing during the further treatment or during wear retain unaltered their natural gloss and feel or that imparted to them by the treatment as well as the stretching-conditions imparted to them in given cases.

A further object of my invention is the production of improved furs or skins, especially lamb's skins, the hair of which after treatment of the skins according to the invention do not show any subsequent shrinking or curling properties.

It is a further object of my invention to produce furs or skins of improved elasticity.

According to my invention the furs or skins are treated with substances from which water-insoluble condensation- and/or polymerisation products are formed in and/or upon the hair. Synthetic resins and products like synthetic resins are chiefly considered as such substances. By synthetic resins are to be understood all products which are known as such in the industry concerned and in the corresponding literature, and by persons skilled in the art that is to say, both synthetic resins (phenol-aldehyde condensation products, glyptal resins and so forth) and also resins formed by the polymerisation of aldehydes, ketones or their mixtures, furthermore resins which are formed by the spontaneous condensation of non-phenolic organic substances or by their condensation with aldehydes or phenols, and the starting materials of which are aliphatic or aromatic compounds (polyvinyl compounds and the like), urea-aldehyde resins, synthetic resins from aldehydes and organic bases not resembling urea, synthetic resins from chemically altered natural resins, resins from benzene, (coumarone resins), wood oil, mineral oil and so forth. Byproducts like synthetic resins are to be understood for example the condensation and polymerisation products known as artificial tanning materials, such as for example the condensation products of cresyl-sulphonic acid, naphthalene-sulphonic acid with aldehydes. The treatment may be carried out in the presence or absence of the catalysts and/or contact substances usually employed in the corresponding branches of industry and known by persons skilled in the art.

The final condensation of the condensation products used is accomplished not only by purely chemical reactions but by thermal treatment as well, such as steaming, i. e., damping and ironing, involving the application of heat and pressure.

It is an important feature of the invention that the substances and/or their concentration and their quantity respectively are chosen in such a manner and/or the reaction is carried out in such a way, that the individual hairs do not stick together by the resulting condensation or polymerisation products. This may be effected by not employing any components in the reaction whose molecules are so large that the reaction products cannot penetrate into the interior of the individual hair of the skin. If the molecular size is suitably chosen, it is supposed that the condensation or polymerisation products are formed in the individual hairs themselves and sticking together of the hairs is prevented. The same points of view are also applicable when the treatment of the skins is to be effected with commercial condensation or polymerisation products in organic solvents as well as in such cases, when the final condensation is to be carried out by chemical or thermic processes. In the treatment of skins which are to come into contact with the human body, it should further be borne in mind that the condensation or polymerisation products should not have any irritant effect on the human skin.

Preferably, the process is carried out in the presence of contact substances, generally organic or inorganic acids, for example sulphuric acid. Other suitable catalysts are for example aluminium chloride, magnesium chloride, natural resins (colophony), and the like.

The process according to the invention will now be explained in connection with the following examples without having the aim to confine the scope of my invention within the limits of these examples.

Example 1

To an aqueous solution containing 3% salicylic acid and 15% formaldehyde, 10 g. aluminium-chloride per liter as a catalyst are added. The pelts are treated with this liquid in a suitable manner and the condensation is carried to the end by heating to a temperature of about 120 degrees Celsius.

Example 2

The pelts are treated in the manner as stated in Example 1 with a not completely polymerized aqueous solution of 5% urea, 5% glycerin, 10% formaldehyde and 2% tartaric acid whereupon the final condensation will be carried on by steaming and ironing to set the hairs.

The furs and skins treated in this manner are highly moisture-proof and remain unaltered in the course of storage as well, as in wear and treatment.

The described treatment of the skins may be carried out independently of the usual manufacture of the furs, for example in the form of a pre-treatment, preferably however in the course of the said manufacture. It has been found particularly advantageous to carry out the formation or the application of the condensation or polymerisation products during the damping of the skins. The application of the reaction components or the solutions of the commercial condensation or polymerisation products may in that case take place before and/or during the damping by immersion, brushing or spraying of the skins.

The skins may also be treated in the usual manner with fillers, dressings, agents for imparting gloss, and so forth. It is also possible to add these agents to the reaction components or solutions employed.

The skins treated according to the process described possess highly improved properties which they retain unaltered also in the course of storage and wear. The treatment with synthetic resins or products like synthetic resins, particularly if this treatment is carried out simultaneously with steaming and ironing, also contributes to a substantial increase in the gloss of the skins, while their original softness and suppleness remains unchanged. The furs are thus substantially and permanently improved.

What I claim is:

1. In a process for improving the hairs of furs and pelts, the step of impregnating the hairs of the furs with substances capable of forming water-insoluble condensation products and steaming and ironing the hairs during the treatment to form said water-insoluble condensation products and set the hairs.

2. In a process for improving the hairs of furs and pelts, the step of impregnating the hairs of the furs with substances capable of forming water-insoluble polymerisation products and steaming and ironing the hairs during the treatment to form said water-insoluble polymerization products and set the hairs.

3. In a process for improving the hairs of furs and pelts, the step of impregnating the hairs of the furs with a substance capable of forming water-insoluble condensation products and steaming and ironing the so-impregnated hairs to form said water-insoluble condensation products and set the hairs.

SIEGFRIED GOTTFRIED.